M. G. HUBBARD.
Harvester.
No. 26,105.
Patented Nov. 15, 1859.
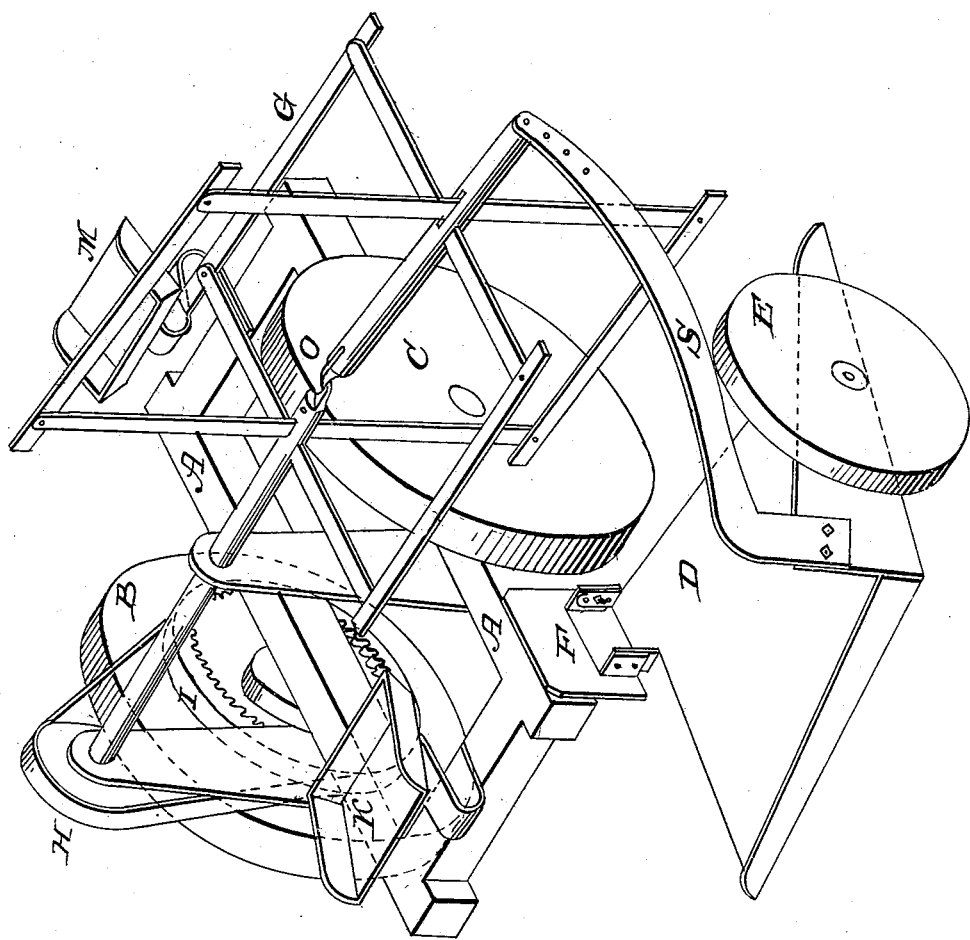

UNITED STATES PATENT OFFICE.

M. G. HUBBARD, OF PENN YAN, NEW YORK.

IMPROVEMENT IN HARVESTERS.

Specification forming part of Letters Patent No. 26,105, dated November 15, 1859.

*To all whom it may concern:*

Be it known that I, M. G. HUBBARD, of Penn Yan, Yates county, New York, have invented certain new and useful Improvements in Machines for Harvesting Grain; and I do hereby declare and ascertain the same as follows, reference being had to the accompanying drawing, illustrative thereof.

My improvements herein described relate to the construction and arrangement of an adjustable and flexible reaper, which may be d - scribed as follows: I hang the frame on a main axle which connects two large wheels, similar to my well-known two-wheeled mowing-machine, and as clearly shown in the drawing hereto attached, in which—

Figure 1 is a perspective view of the plan and arrangement of my machine.

A is the frame.

B is the drive-wheel.

C is the inner supporting-wheel.

D is the platform on which the grain falls when cut, and on the front edge of which may be arranged any of the ordinary styles of cutting apparatus which may be operated by gearing from the drive-wheel.

E is the outer supporting-wheel, by which the outer end of the platform is supported and by which its height is adjusted.

F is an adjustable hinge, by which the platform is flexibly attached to the machine, and by means of which the height of the inner end of the platform may be adjusted.

G is the reel by which the grain is reeled onto the platform, and which I find it necessary to construct so as to render it flexible like the platform, and so that it will at all times occupy nearly the same relative position to the platform on uneven ground.

S is the outer reel-arm, which it is necessary to attach to the platform in such a manner as to render it yielding or flexible laterally in order to accommodate itself to the operation of the reel whenever the level of the platform is changed on rough ground.

H is the band-wheel by which the reel is rotated, and which I have found may best be done from the internal gear marked I, which is attached to the drive-wheel, and for this reason I have found it best to operate the cutting apparatus by the said internal gear and the ordinary bevel-gear similar to the common arrangement in my aforesaid well-known two-wheeled mowing-machines, and by thus starting at the drive-wheel with the said internal gear I am enabled to use the same for the double purpose of driving the cutters by gear and the reel by a band, and thereby attain a sufficient amount of friction-surface to reel up the heaviest tangled grain.

K is the raker's seat, located on the rear of the main frame and in convenient position to rake the cut grain off from the platform.

M is the driver's seat, located on the front of the main frame and in such position as to balance the raker on the two large wheels B and C.

My improvements consist, first, in combining the hinge F, when made adjustable vertically, with the adjustable outer wheel, E, by means of which a flexible platform is attained which can be adjusted to any desired height at either end; second, in combining a universal joint, O, with the reel G, by means of which a flexible reel is attained that will conform to the position of the platform on uneven ground, the arms and wings of this reel being hinged or pivoted, or they may be made elastic; or the arms may be permanent in the reel-shaft and the wings attached or pivoted to the arms in outer end of shaft by means of long slots, to enable them to conform to the variations of the reel-shaft on uneven ground; third, in combining the flexible platform D with a flexible reel, by means of which the front edge of the platform and the lower reel-wing will always be kept parallel and the grain will be laid evenly on the platform whatever may be the surface of the ground; fourth, in combining the outer reel-arm, S, with a flexible platform and a flexible reel when said reel-arm is made yielding or flexible laterally, so as to permit the outer end of the reel-shaft to move relatively out and in whenever the outer end of the platform is elevated or depressed; fifth, in combining the internal gear, I, on the drive-wheel with the reel-band wheel H, for the purpose of driving the reel by a band therefrom, and whereby the said internal gear-rim is made to serve a double purpose; sixth, in combining the raker's seat K, when located on the rear of the main frame, and the driver's seat M, when located on the front of said frame, with the flexible platform D and reel G, whereby the raker and driver are carried on the two large wheels and entirely independent of the platform, and the outer end of the platform and reel left independent vertically, by which arrangement great perfection of work is attained on uneven ground and the machine is enabled to turn corners freely and side draft is entirely avoided.

Having thus fully described my invention, what I claim as new, and desire to secure by Letters Patent, is—

1. The universal joint O in the reel, in which the arms and wings are pivoted or flexible and yielding, substantially as above specified.

2. The combination of the flexible reel G with the flexible platform D, substantially in the manner and for the purposes specified.

3. The outer reel-arm, S, in combination with the flexible reel and platform, as herein described.

M. G. HUBBARD.

Witnesses:
R. PHELPS,
G. HOLMES.